(12) United States Patent
Lai

(10) Patent No.: US 10,655,675 B2
(45) Date of Patent: May 19, 2020

(54) DOUBLE-LAYER SLIDING BEARING

(71) Applicant: SHINE YING CO., LTD, Hsinchu (TW)

(72) Inventor: Wen-Chen Lai, Hsinchu (TW)

(73) Assignee: SHINE YING CO., LTD., Hsinchu (TW)

( * ) Notice: Subject to any disclaimer, the term of this patent is extended or adjusted under 35 U.S.C. 154(b) by 0 days.

(21) Appl. No.: 15/611,664

(22) Filed: Jun. 1, 2017

(65) Prior Publication Data
US 2018/0003226 A1    Jan. 4, 2018

(30) Foreign Application Priority Data
Jun. 30, 2016  (TW) .............................. 105120705 A

(51) Int. Cl.
*F16C 33/14* (2006.01)
*F16C 33/10* (2006.01)
*F16C 33/12* (2006.01)
*F16C 17/02* (2006.01)
*B22F 3/00* (2006.01)

(52) U.S. Cl.
CPC ............ *F16C 33/145* (2013.01); *B22F 3/004* (2013.01); *F16C 17/02* (2013.01); *F16C 33/104* (2013.01); *F16C 33/1065* (2013.01); *F16C 33/122* (2013.01); *F16C 33/128* (2013.01); *B22F 2998/10* (2013.01)

(58) Field of Classification Search
CPC ...... F16C 33/08; F16C 33/104; F16C 33/122; F16C 33/128; F16C 33/145
See application file for complete search history.

(56) References Cited

U.S. PATENT DOCUMENTS

| 7,785,013 B2 * | 8/2010 | Egami | F16C 33/201 384/283 |
|---|---|---|---|
| 2016/0215820 A1 * | 7/2016 | Sugai | F16C 33/14 |
| 2017/0130772 A1 * | 5/2017 | Lai | F16C 17/02 |

* cited by examiner

Primary Examiner — James Pilkington
(74) Attorney, Agent, or Firm — WPAT, PC

(57) ABSTRACT

A double-layer sliding bearing made of a sintered double-layer green compact comprises an inner layer and an outer layer. A circular bearing surface is formed on either an inner periphery of the inner layer or an outer periphery of the outer layer. Either the inner layer or the outer layer with the bearing surface has a higher forming density and a thinner wall thickness than the other layer without the bearing surface, resulting in notable radial differences in forming density and porosity between the inner layer and the outer layer.

7 Claims, 6 Drawing Sheets

DOUBLE-LAYER SLIDING BEARING

FIELD OF THE INVENTION

The invention relates to sliding bearing techniques, particularly to a double-layer sliding bearing made of a sintered double-layer green compact having notable radial differences in forming density and porosity for improving performance under severe operating conditions.

BACKGROUND OF THE INVENTION

Various types of sliding bearings possessing self-lubricating feature have been developed; one of the important types being those made from a uniform porous structure via compacted and sintered metals formed by a technique known as powder metallurgy. In such sliding bearings to achieve a high porosity cannot balance a high density need for overall structural robustness and wear resistance of a bearing surface which is referred to a sliding surface for bearing relative rotation. In contrast, to achieve the high density cannot balance the high porosity need for sufficient lubricating media content. Hence to apply those to severe operating conditions, such as shaft rotating at high speed, heavy load and strong vibration, especially when contact pressure and velocity (PV) limit larger than 500 MPa·m/min will be subject to stern challenges. The lubricating media means lubricating oil and lubricant having a higher viscosity than the lubricating oil.

SUMMARY OF THE INVENTION

The double-layer sliding bearing made of a sintered double-layer green compact comprises an inner layer and an outer layer wherein either the inner layer or the outer layer with a bearing surface is defined as a first layer that has a thinner wall thickness and a higher forming density than the other layer without the bearing surface defined as a second layer.

The invention of the double-layer sliding bearing can notably provide many advantages, such as:

The invention provides the second layer with high porosity to impregnate sufficient lubricating media and prolong the service life.

The invention provides the first layer with high density to enhance wear resistance and anti-fatigue friction of the bearing surface.

The invention provides at least one groove axially indented on the bearing surface of the inner layer to accommodate debris or oxides.

The invention provides a molding process for a reinforced first layer to optimize density uniformity and enhance structural strength.

The invention provides a molding process for a reinforced and perforated first layer to smooth transmission of the lubricating media.

The invention provides a molding process for the green compact to combine a prepared first layer with a compressed powder forming the second layer.

The invention provides a novel sliding bearing with good lubricity, robustness and anti-abrasion to apply to the severe operating conditions.

DETAILED DESCRIPTION

Figure 1:
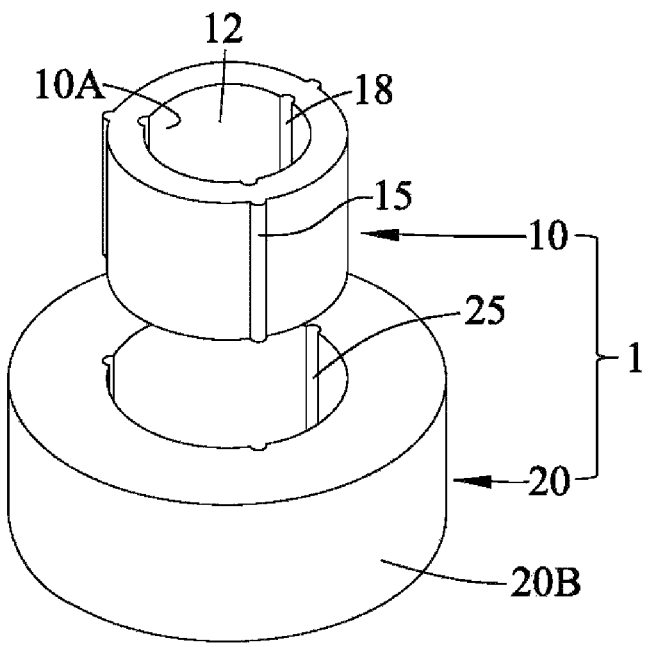
FIG. 1 is an exploded view of a double-layer green compact of a first embodiment of a double-layer sliding bearing.

FIG. 1 is a first embodiment of a double-layer green compact 1 of a double-layer sliding bearing. The double-layer sliding bearing made of a sintered double-layer green compact 1 comprises an inner layer 10 and an outer layer 20. An inner periphery of the outer layer 20 and an outer periphery of the inner layer 10 are in contact with each other to form the double-layer green compact 1. The inner layer 10 has a porous thinner wall thickness and a higher forming density than the outer layer 20 and may contain a certain amount of anti-abrasion element. The outer layer 20 has a porous thicker wall thickness and a lower forming density (i.e., higher porosity) than the inner layer 10 and may contain a small amount of the element. The shape and size of the inner periphery of the outer layer 20 match with that of the outer periphery of the inner layer 10. A circular bearing surface 10A forming an axial hole 12 for bearing a rotatable shaft (not shown) is formed on an inner periphery of the inner layer 10. A mounting surface 20B for the installation of the bearing is formed on an outer periphery of the outer layer 20. Thus the double-layer sliding bearing has significant radial differences in forming density and porosity, and excellent wear resistance on the bearing surface 10A. The outer periphery of the inner layer 10 can be sets at least one rib 15 formed axially thereon to latch on corresponding at least one slot 25 formed on the inner periphery of the outer layer 20 to enhance structural robustness, anti-vibration capability and load capacity. Similarly, the rib 15 may also be formed on the inner periphery of the outer layer 20 to latch on corresponding slot 25 formed on the outer periphery of the inner layer 10.

Further, the double-layer sliding bearing includes at least one groove 18 axially indented on the bearing surface 10A of the inner layer 10. Through the rotation of the shaft, the surplus lubricating media on the bearing surface 10A can be introduced into the groove 18 to reduce the loss of lubricating media and prevent the internal pollution of motor. In addition, the fine debris or oxides on the bearing surface 10A can also be introduced into the groove 18 to reduce tribology friction and avoid wear damage.

FIGS. 2-5 provide a molding process to form the double-layer green compact 1 of the double-layer sliding bearing via a prepared inner layer 10 to simplify the fabrication in mass production. The mould for the molding process includes a central core rod 30 surrounded by a die 32, between which an upper punch 34 and a lower punch 36 can apply compaction forces separately. A cavity 31 of the mould is a concaved space with an elevation not higher than a die surface 33 and is formed by surrounding the core rod 30 and the die 32 and the upper punch 34 and the lower punch 36, all of which can be positioned, moved up and down separately.

Figure 2:
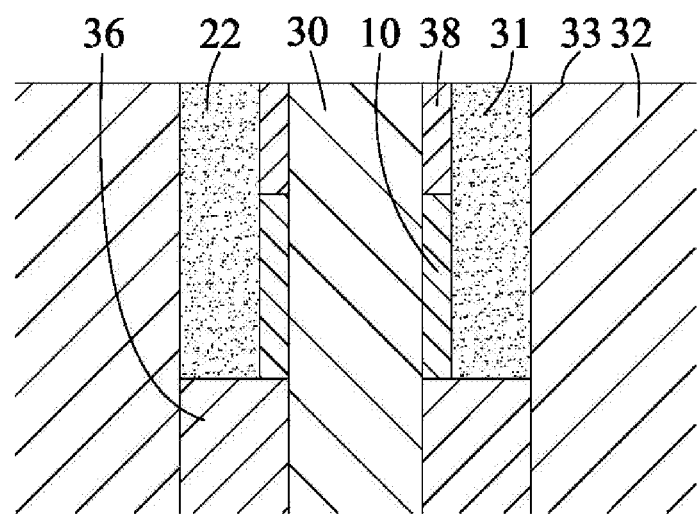
FIG. 2 is a schematic of a molding process for the double-layer green compact of the first embodiment of the double-layer sliding bearing before compaction.

Referring to FIG. 2, after loading the prepared inner layer 10 in the cavity 31 to respectively make its lower end face and the bearing surface 10A in contact with the corresponding lower punch 36 and axial periphery of the core rod 30, a dummy part 38 having a same diameter of the bearing surface 10A and a same wall thickness of the inner layer 10 is loaded in the cavity 31 in contact with the inner layer 10 and with its upper end face aligning to the die surface 33. Then a powder 22 forming the outer layer 20 is filled into a remaining space of the cavity 31.

Figure 3:
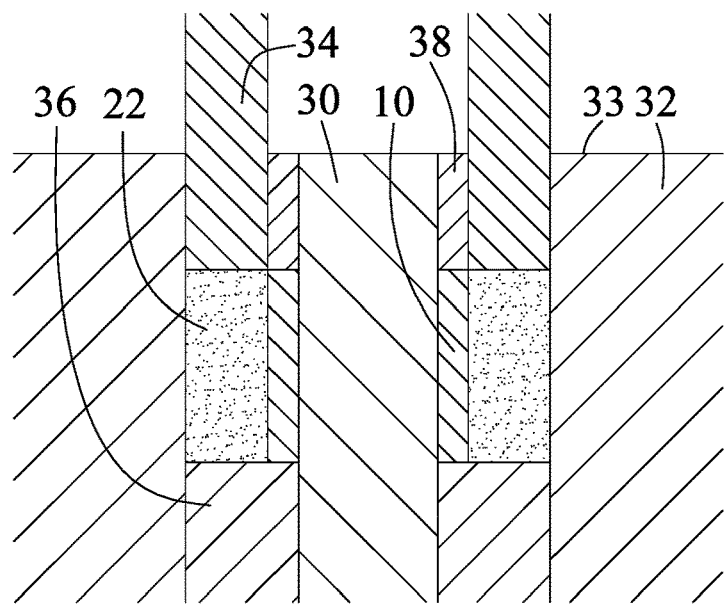
FIG. 3 is a schematic of the molding process illustrated in FIG. 2 to compress the filled powder via an upper punch.

Referring to FIG. 3, the descending upper punch 34 further applies a compaction force on a filled powder 22 until an end face of the upper punch 34 aligns to an upper end face of the inner layer 10, so that a length of a compressed powder 22 forming the outer layer 20 is equal to a length of the inner layer 10, thereby forming the double-layer green compact 1 of the double-layer sliding bearing in the cavity 31.

Figure 4:
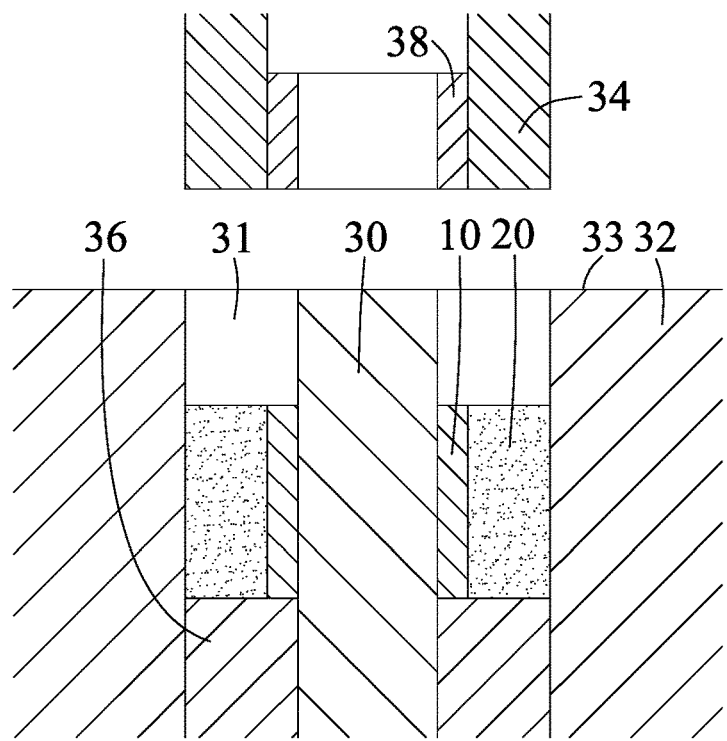
FIG. 4 is a schematic of the molding process illustrated in FIG. 3 to house a dummy part within the upper punch.

Referring to FIG. 4, the dummy part 38 is housed in the upper punch 34 and the upper punch 34 is ascended away from the die surface 33.

Figure 5:
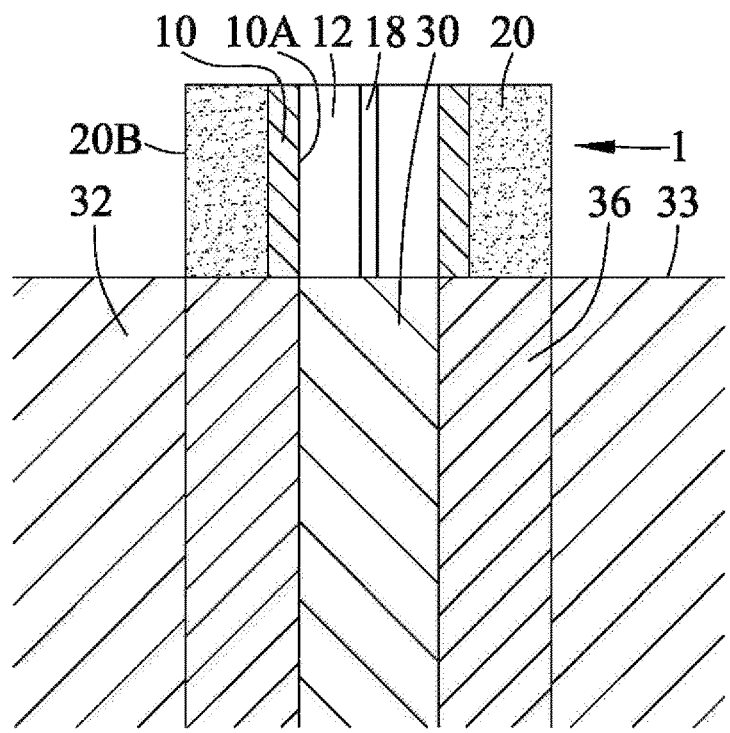
FIG. 5 is a schematic of the molding process illustrated in FIG. 4 to take the bearing out of a cavity.

Referring to FIG. 5, the ascending lower punch 36 pushes the bearing 1 until an end face of the lower punch 36 aligns to the die surface 33, thereby taking the double-layer green compact 1 out of the cavity 31.

Figure 6:
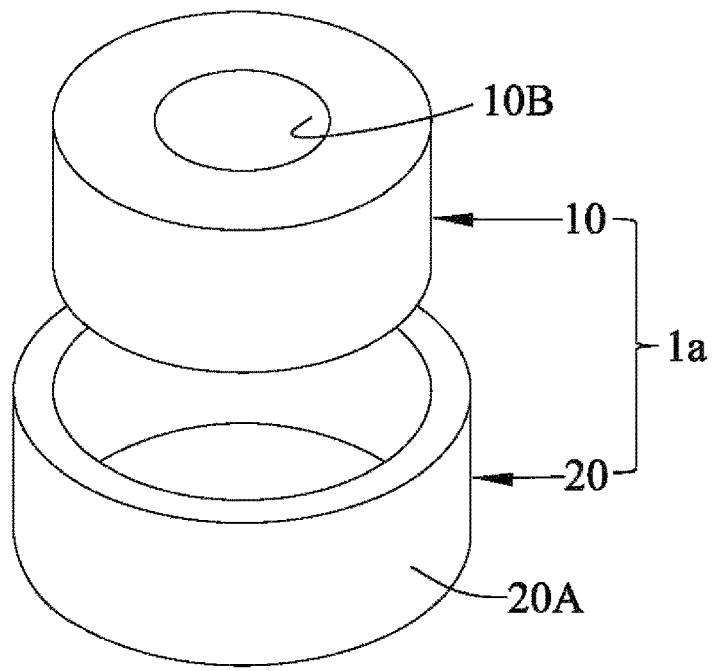
FIG. 6 is an exploded view of a double-layer green compact of a second embodiment of a double-layer sliding bearing.

FIG. 6 is a double-layer green compact 1a of a second embodiment of a double-layer sliding bearing including an inner layer 10 and an outer layer 20. This differs from the first embodiment shown in FIG. 1 mainly in that the outer layer 20 having a bearing surface 20A on the outer periphery is arranged by a porous thinner wall thickness and a higher forming density than the inner layer 10 having a mounting surface 10B on the inner periphery.

Figure 7:
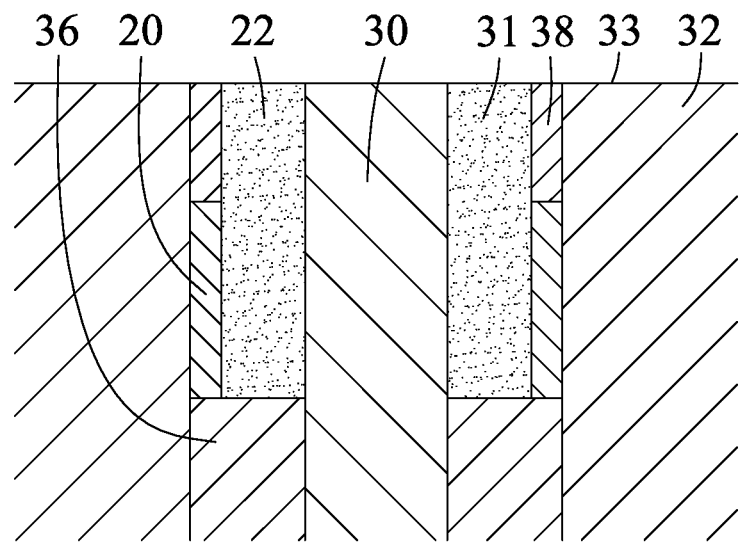
FIG. 7 is a schematic of a molding process for the double-layer green compact of the second embodiment of the double-layer sliding bearing before compaction.

FIG. 7 provides a molding process before compaction, similar to the first embodiment shown in FIG. 2, to form the double-layer green compact 1a. After loading the prepared outer layer 20 in the cavity 31 to respectively make its lower end face and the bearing surface 20A in contact with the corresponding lower punch 36 and axial periphery of the die 32, a dummy part 38 having a same diameter of the bearing surface 20A and a same thickness of the outer layer 20 is loaded in the cavity 31 in contact with the outer layer 20 and with its upper end face aligning to the die surface 33. Then a powder 22 forming the inner layer 10 is filled into a remaining space of the cavity 31. Thus the double-layer green compact 1a can be formed by the same subsequent modeling process illustrated in the first embodiment.

The inner layer 10 and the outer layer 20 of the double-layer green compact 1, 1a can be made respectively by a blending powder 22 from a commonly used base element such as at least one of Fe powder, Cu powder and C powder 22 and the anti-abrasion element such as at least one of Ni powder, Cr powder, Mo powder and Mn powder 22.

In fact, by combining the two embodiments mentioned above, the double-layer green compact 1 or 1a can be simplified to comprise a prepared first layer and a second layer wherein either the inner layer 10 or the outer layer 20 with the bearing surface 10A or 20A is defined as the prepared first layer that has a thinner wall thickness and a higher forming density than the second layer without the bearing surface. As such, the prepared first layer may have a considerable degree of structural strength and abrasion resistance, and the second layer may have a higher porosity for containing sufficient lubricating medium and shock-absorbing capability.

Further, the inner layer 10 and the outer layer 20 can also be made from the base element only. The Fe powder 22 includes at least one of pure Fe powder 22 and Cu coated Fe powder 22. The Cu in the Cu powder 22 and Cu coated Fe powder 22 includes at least one of copper, brass and bronze.

Figure 8:
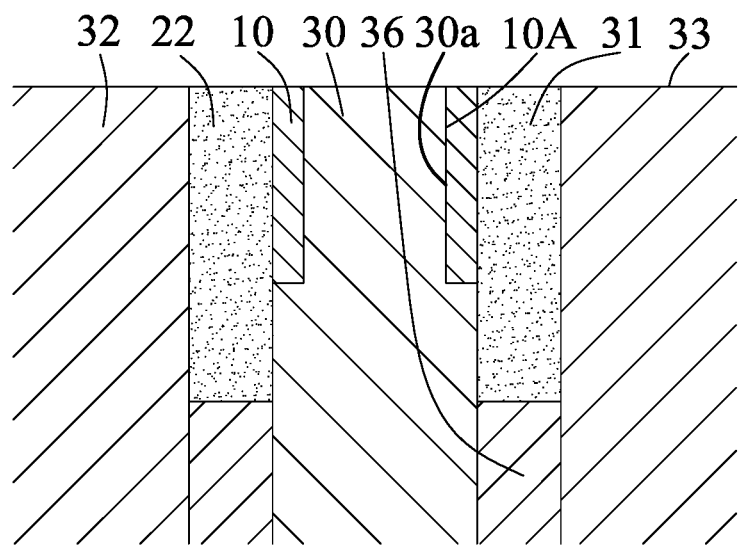
FIG. 8 is a schematic of a molding process for a double-layer green compact before compaction of a third embodiment of a double-layer sliding bearing.

FIG. 8 is a third embodiment to illustrate a simplified molding process before compaction to form the double-layer green compact 1 of the double-layer sliding bearing without the use of the dummy part 38 via a mould slightly modified from the mould. The mould has an annular groove 30a with an axial depression formed on the core rod 30 to fit just right for accommodating the prepared first layer (i.e., the inner layer 10) therein. After loading the prepared first layer in the annular groove 30a, a powder 22 forming the second layer (i.e., the outer layer 20) is filled into a remaining space of the cavity 31 with an axial length of a filled powder 22 of the second layer longer than that of the prepared first layer. The subsequent modeling processes (not shown) include that the upper punch 34 with its end face covering an upper area of the cavity 31 abuts on the die surface 33, and the ascending lower punch 36 further applies a compaction force on the filled powder 22 of the second layer until an end face of the lower punch 36 aligns to a lower end face of the prepared first layer, thereby forming the double-layer green compact 1 in the cavity 31. After ascending the upper punch 34 away from the die surface 33, the die 32 and the core rod 30 are simultaneously descended to take the double-layer green compact 1 out of the cavity 31.

Figure 9:
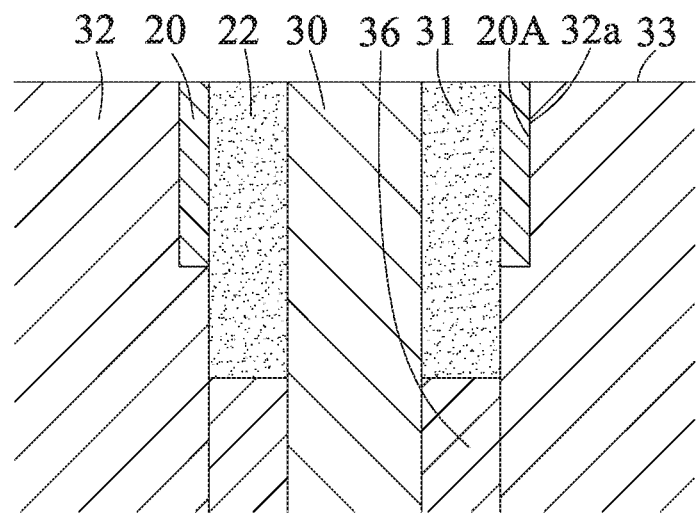
FIG. 9 is a schematic of a molding process for a double-layer green compact before compaction of a fourth embodiment of a double-layer sliding bearing.

FIG. 9 is a fourth embodiment, similar to the third embodiment shown in FIG. 8, to illustrate a simplified molding process before compaction to form the double-layer green compact 1a. The mould has an annular groove 32a with an axial depression formed on the die 32 to fit just right for accommodating the prepared first layer (i.e., the outer layer 20) therein. After loading the prepared first layer in the annular groove 32a, a powder 22 forming the second layer (i.e., the inner layer 10) is filled into a remaining space of the cavity 31 with an axial length of a filled powder 22 longer than that of the prepared first layer. Thus, the double-layer green compact 1a can be formed by the same subsequent molding process illustrated in the third embodiment.

The invention can be widely applied to different devices; the position and form for the installation of the double-layer sliding bearing are not limited to the drawings shown in the mounting surface 20B, 10B; and also, the first layer and the second layer need not be limited to the same length. To meet such application requirements, a similar modeling process for the double-layer sliding bearing can be realized by modifications or adjustments of the embodiments of the invention via the disclosed technical means and features, such as dimensions of the relevant mould components, configuration of the cavity 31, number and length of the dummy part 38 (if necessary), filling position of the powder 22, compressing length and position of the upper punch 34 and the lower punch 36, which do not depart from the spirit and scope of the invention.

Figure 10:
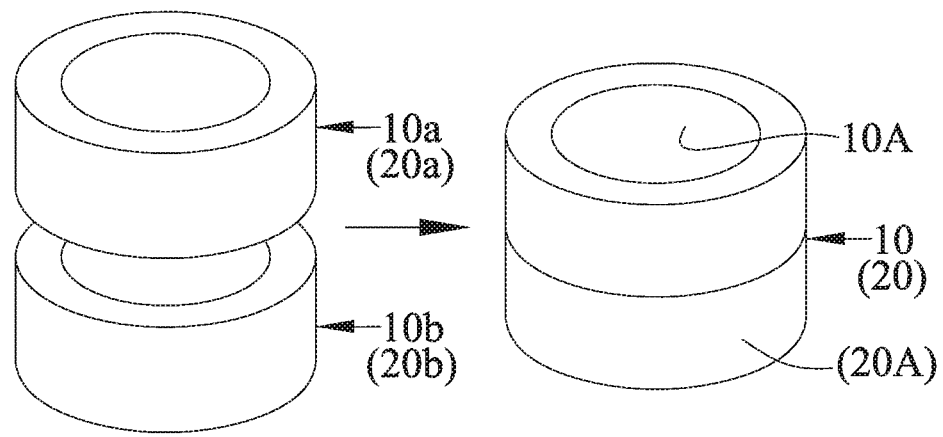
FIG. 10 is a schematic of a molding process for a reinforced first layer of a fifth embodiment of a double-layer sliding bearing.

FIG. 10 is a fifth embodiment to prepare a reinforced first layer 10 (or 20) of the double-layer green compact 1 (or 1a). In practical, there is a dilemma in forming the first layer that it too thin will cause poor filling property of the powder 22, seriously affecting uniformity of high density compaction; instead, it too thick will raise material cost due to increase the use of anti-abrasion or Cu element. The technical means for solving the dilemma is provided as follow. First of all, at least two units, as shown in FIG. 10 with reference signs 10a (or 20a), 10b (or 20b), each shorter than the first layer are respectively formed by compressing the filled powder 22 forming the first layer in the cavity 31 via at least one of the upper punch 34 and the lower punch 36. Only two units are schematically shown in FIG. 10 to simplify the illustration. Each of the at least two units has a same diameter of the bearing surface 10A (or 20A) and a same wall thickness of the first layer. A total length of at least two axially butted units is longer than a length of the first layer causing a forming density of each of the at least two units lower than that of the first layer. Then the at least two axially butted units are loaded in the cavity 31 and compressed at least once via the at least one of the upper punch 34 and the lower punch 36 until the total length of the at least two axially butted units is equal to the length of the first layer.

Figure 11:
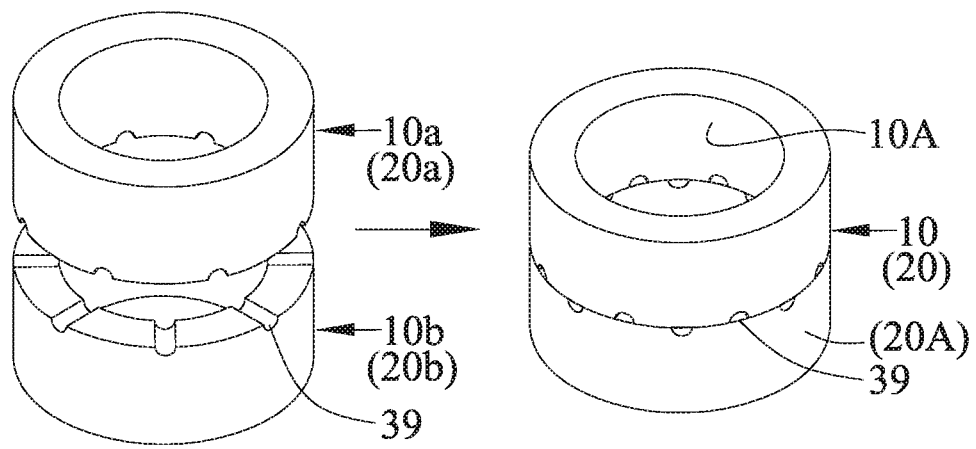
FIG. 11 is a schematic of a molding process for a reinforced and perforated first layer of a sixth embodiment of a double-layer sliding bearing.

FIG. 11 is a sixth embodiment to prepare a reinforced and perforated first layer 10 (or 20) of the double-layer green compact 1 (or 1a). This differs from the fifth embodiment mainly in that plural penetrating notches 39 are radially indented on at least one of two adjacent end faces between at least one pair of two adjacent units, as shown in FIG. 11 with reference signs 10a (or 20a), 10b (or 20b), of the at least two axially butted units. The reinforced and perforated first layer not only enhances structural robustness of the double-layer sliding bearing and wear resistance of the bearing surface 10A (or 20A), but also ensures smooth transmission of the lubricating media enriched in the high porosity second layer to the bearing surface 10A (or 20A), thereby significantly improving the PV limit of the double-layer sliding bearing for long-term operation under the severe operating conditions.

While the preferred embodiments of the invention have been set forth for the purpose of disclosure, they are not the limitations of the invention, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A double-layer sliding bearing made of a sintered double-layer green compact, comprising:
    an inner layer and an outer layer, a circular bearing surface being formed on either an inner periphery of the inner layer or an outer periphery of the outer layer;
    wherein either the inner layer or the outer layer with the bearing surface is defined as a first layer that has a thinner wall thickness and a higher forming density than the other layer without the bearing surface defined as a second layer;
    wherein the first layer includes at least two units arranged in an axially butted manner.

2. The double-layer sliding bearing of claim 1, wherein at least one of the inner layer and the outer layer is made from at least one of Fe powder, Cu powder and C powder, the Fe powder includes at least one of pure Fe powder and Cu coated Fe powder, the Cu in the Cu powder and Cu coated Fe powder includes at least one of copper, brass and bronze.

3. The double-layer sliding bearing of claim 1, wherein at least one of the inner layer and the outer layer contains at least one of Ni powder, Cr powder, Mo powder and Mn powder.

4. The double-layer sliding bearing of claim 1, wherein at least one of the inner layer and the outer layer is made from a blending powder of at least one of Fe powder, Cu powder and C powder and at least one of Ni powder, Cr powder, Mo powder and Mn powder, the Fe powder includes at least one of pure Fe powder and Cu coated Fe powder, the Cu in the Cu powder and Cu coated Fe powder includes at least one of copper, brass and bronze.

5. The double-layer sliding bearing of claim 1, wherein at least one groove is axially indented on the bearing surface of the inner layer.

6. The double-layer sliding bearing of claim 1, wherein two adjacent end faces between each pair of two adjacent units of the at least two units are in contact with each other.

7. The double-layer sliding bearing of claim 6, wherein the first layer includes at least one penetrating notch and each of the at least one penetrating notch is radially indented on at least one of the two adjacent end faces between at least one pair of two adjacent units of the at least two units.

* * * * *